Jan. 20, 1942.        J. B. MARTIN        2,270,457
APPARATUS FOR COMPARING THE COLOR OF LIQUID COFFEE
Filed Sept. 6, 1940
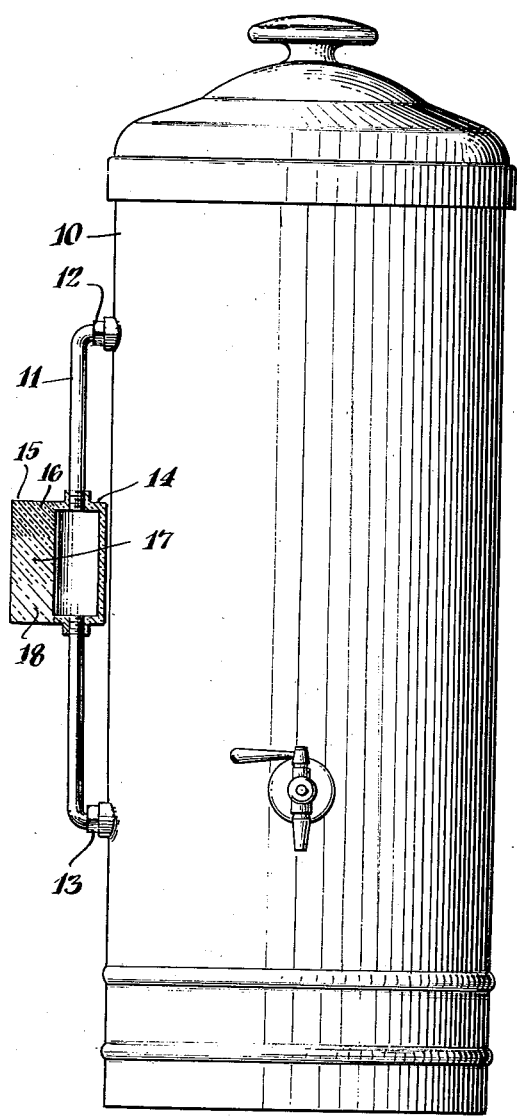
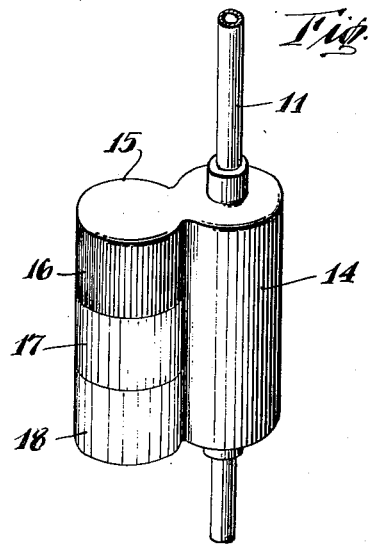
INVENTOR
John B. Martin
BY
ATTORNEY Patented Jan. 20, 1942

2,270,457

UNITED STATES PATENT OFFICE 2,270,457

APPARATUS FOR COMPARING THE COLOR OF LIQUID COFFEE

John B. Martin, Glen Ridge, N. J.

Application September 6, 1940, Serial No. 355,551

1 Claim. (Cl. 88—14)

This invention relates to improvements in apparatus for testing and measuring the strength of liquids, particularly of liquid coffee while it is brewing to permit brewing to a predetermined strength and consequently predetermined flavor and aroma, suiting the individual taste.

It is the principal object of my invention to provide a device which may be used as an adjunct to coffee urns as for instance used in large coffee-making establishments as hotels, restaurants, etc., for continued reading and comparison during the coffee-brewing operation.

A further object of my invention is the provision of a device including a means for comparing the color of the liquid coffee with a color-chart of various degrees of color strength, the said color-chart serving as a gauge or standard for visual comparison with the color of the coffee being brewed, so that the brewing may be continued to and stopped at a predetermined point, i. e. when the color of the liquid coffee matches the color of the chart which may show as many shades as desirable for comparison. For restaurants, etc., this color chart may be standardized to show three shades only, viz. breakfast, or dinner coffee, and demi-tasse or after-dinner coffee or the like desired shades.

A still further object of my invention is the provision of a device of this character which may be attached to any of the existing coffee-urns or the like without materially changing their individual construction, and is comparatively simple and inexpensive in its construction, yet durable and highly efficient in use.

The device will be found to fill the need for a ready, quick and approximately accurate means of brewing liquid coffee to desired or required unvarying standards of strength, aroma, color and flavor, preventing the so undesirable fluctuations in these qualities of the finished product, said fluctuations being due to common variations in both the quantity of ground coffee used in brewing and the length of time the coffee is permitted to brew in order to satisfy the individual taste of coffee-drinkers.

These and other objects and advantages of my invention will become more fully known as the description thereof proceeds and will then be specifically defined in the appended claim.

In the accompanying drawing forming a material part of this disclosure:

Fig. 1 is a front elevation of a coffee urn equipped with a testing and comparing device according to my invention in section.

Fig. 2 is a detail view of the device separately from the urn.

As illustrated, a coffee urn or percolator of any desired type and construction has attached thereto a stand-pipe 11 to allow a circulation of the coffee from urn 10 through the upper elbow 12 and into the urn again through the lower elbow 13.

In approximately the middle of the stand-pipe is interpolated therein a glass-cylinder 14 having formed therewith a laterally disposed solid, tinted glass cylinder 15 either molded in one piece with cylinder 14 or made separately and provided with suitable fittings for attachment.

The tints of the glass cylinder may be of any desired shade and in any desired number, preferably as shown dark, as indicated at 16, medium as at 17 and light as at 18 if the device for instance is to be used with large coffee making establishments.

The use and operation of my device will be clear from the above description thereof by having simultaneous reference to the drawing, and it will be evident that the strength of a coffee brew can quickly and readily be ascertained by comparing its color flowing through the stand-pipe with the color-chart on glass cylinder 15.

It will be understood that I have described and shown the preferred form of my device only as one example of the many possible ways to practically construct the same, and that I may make such changes in the general arrangement thereof and in the construction of its minor details as come within the scope of the appended claim without departure from the spirit of my invention and the principles involved.

Having thus described my invention, what I claim as new, and desire to secure by Letters Patent is:

An attachment for coffee urns, having an outer standpipe, comprising a hollow glass cylinder adapted to be interposed in the standpipe at approximately the middle thereof, a solid glass cylinder integrally made with said hollow cylinder, said solid cylinder tinted to indicate a dark, a medium and a light color to indicate by comparison the color and thereby the strength of the coffee brewed in the urn and passing through the hollow cylinder to permit the regulation of the coffee brew to a desired strength.

JOHN B. MARTIN.